UNITED STATES PATENT OFFICE.

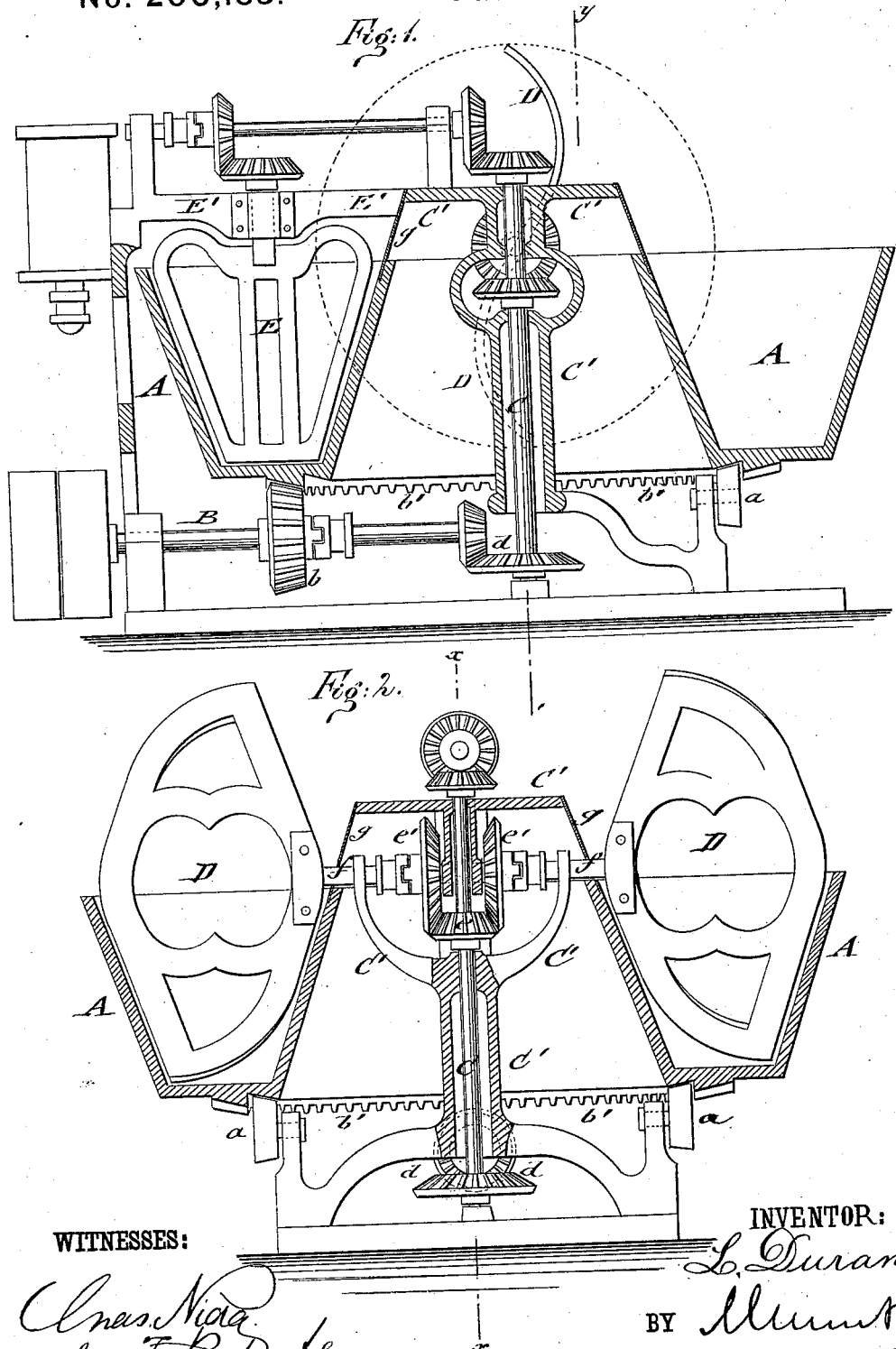

LOUIS DURAND, OF QUEBEC, PROVINCE OF QUEBEC, CANADA, ASSIGNOR TO HIMSELF AND H. C. BOSSE, OF SAME PLACE.

IMPROVEMENT IN DOUGH-KNEADING MACHINES.

Specification forming part of Letters Patent No. 200,183, dated February 12, 1878; application filed December 6, 1877.

*To all whom it may concern:*

Be it known that I, LOUIS DURAND, of Quebec, in the Province of Quebec and Dominion of Canada, have invented a new and Improved Dough - Kneading Machine, of which the following is a specification:

In the accompanying drawing, Figure 1 represents a vertical longitudinal section on line $x$ $x$, Fig. 2, of my improved dough-kneading machine; and Fig. 2, a vertical central section of the same, at right angles to the former, on line $y$ $y$, Fig. 1.

Similar letters of reference indicate corresponding parts.

This invention has reference to an improved construction of dough - kneading machines, that may be run, when built on large scale, by power, and when made on smaller scale, for family use, by hand, for the purpose of facilitating the fatiguing labor of kneading, and accomplishing the same in quicker, cleaner, and more perfect manner.

Referring to the drawing, A represents the trough, into which the ingredients to be mixed and kneaded are placed, and which is supported on three or more tapering anti-friction rollers, $a$, or in other manner. The trough A is of ring shape, and tapering from the wider top to the narrower bottom. It is revolved from a hand or power driven shaft by means of a bevel-wheel, $b$, that meshes with cogs $b'$ at the under side of trough.

The shaft B drives, also, by a conical center gear, $d$, the vertical center shaft C, that turns in a bottom step and in a top bearing of a strong center standard, C', which is secured to the bed-plate, and passes through the conical center space formed by the trough, upward to suitable height above the same.

A bevel-wheel, $e$, of the vertical shaft C intermeshes with one or more bevel-wheels, $e'$, of horizontal shafts $f$, that turn in bearings of the middle standard, and carry at their ends, that project over the inner edge of the trough, the rigidly-fastened stirrers or kneaders D.

The kneaders D are made with two diametrically opposite straight sides, that correspond to and pass along the sides of the trough, while the remaining sides are curved toward the points of the kneaders. The outer parts of the kneader are strengthened by lateral braces. These kneaders cut through the dough by being revolved in opposite direction to the trough, and also scrape off the sides, so as to return the dough to the center of the trough.

One or more vertically - revolving dough-breakers, E, are arranged intermediately between the kneaders, and also set in motion from the vertical center shaft by a top shaft or shafts and suitable bevel-gear, the shaft of each vertical screw turning in a strong bearing of a top bridge, E', that extends from the tops of the center standard to a side standard of the bed-plate. The vertically-turning dough-breaker E is made with tapering sides, that correspond to the sides of the revolving trough, and are connected by top and bottom pieces, which are stiffened by vertical center pieces. The dough-breaker E breaks up the dough in lateral direction, while the kneaders cut in a direction opposite to the motion of the dough as imparted by the revolving trough, so as to thoroughly mix the dough, and present the same always in new and changed position to the kneaders and dough-breaker, and produce thereby the thorough and uniform intermixing of all the parts of the dough.

A guard-plate, $g$, is attached to the upper part of the center standard, and extended above the inner edge of the trough from one kneader past the dough-breaker to the other kneader, for preventing any part of the dough from falling into the center space and interfering with the driving - gear arranged on the same. The dough is rapidly and uniformly mixed and kneaded by the joint action of the revolving trough and the horizontally-revolving kneaders and vertically-revolving dough-breaker, so as to be adapted for family and business purposes.

Having thus described my invention, I claim as new and desire to secure by Letters Patent—

The combination, in a dough mixing or kneading machine, of a revolving ring-shaped trough, having tapering body, with one or more kneaders or mixers, revolving in opposite direction to trough, and having straight opposite sides, corresponding to inclination of sides of trough, and curved intermediate sides, substantially as specified.

LOUIS DURAND.

Witnesses:
HENRY C. AUSTIN,
R. C. DE VEAUMONY.